US012780089B1

(12) United States Patent
Cb et al.

(10) Patent No.: US 12,780,089 B1
(45) Date of Patent: Nov. 3, 2026

(54) INTERIOR LIGHT ASSEMBLY FOR A VEHICLE WITH LIGHT ASSEMBLY EMITTING LIGHT INTO AND AWAY FROM THE PASSENGER COMPARTMENT

(71) Applicant: FCA US LLC, Auburn Hills, MI (US)

(72) Inventors: Sarath Chander Cb, Chennai (IN); Muniraj Saminathan, Chennai (IN)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 19/329,651

(22) Filed: Sep. 16, 2025

(51) Int. Cl.

| | |
|---|---|
| ***B60Q 3/20*** | (2017.01) |
| ***B60G 3/20*** | (2006.01) |
| ***B60Q 1/00*** | (2006.01) |
| ***B60Q 1/44*** | (2006.01) |
| ***B60Q 3/72*** | (2017.01) |
| ***B60Q 3/76*** | (2017.01) |

(52) U.S. Cl.
CPC ............. *B60G 3/20* (2013.01); *B60Q 1/0017* (2013.01); *B60Q 1/441* (2013.01); *B60Q 3/72* (2017.02); *B60Q 3/76* (2017.02); *B60Q 2500/30* (2022.05)

(58) Field of Classification Search
CPC .......... B60Q 3/20; B60Q 3/208; B60Q 3/217; B60Q 3/225; B60Q 3/229; B60Q 3/233; B60Q 3/242; B60Q 3/252; B60Q 3/258; B60Q 3/267; B60Q 3/275; B60Q 3/283; B60Q 3/292; B60Q 1/44; B60Q 1/268; B60Q 2500/30
See application file for complete search history.

(56) References Cited

U.S. PATENT DOCUMENTS

| | | | | |
|---|---|---|---|---|
| 4,896,136 A * | 1/1990 | Hotovy | .................... | B60Q 3/74 340/479 |
| 5,398,985 A * | 3/1995 | Robinson | ................. | B60J 7/223 296/180.1 |
| 9,682,647 B2 * | 6/2017 | Godbillon | ................ | B60Q 3/64 |
| 2017/0144601 A1 * | 5/2017 | Martinson | ............... | B60R 1/007 |

FOREIGN PATENT DOCUMENTS

| | | |
|---|---|---|
| JP | H05104996 A | 4/1993 |
| JP | 2562520 Y2 | 2/1998 |
| JP | 2000043644 A | 2/2000 |
| JP | 3169555 B2 | 5/2001 |
| JP | 3584728 B2 | 11/2004 |

* cited by examiner

*Primary Examiner* — Robert J May
(74) *Attorney, Agent, or Firm* — Jeremy J. Klobucar

(57) ABSTRACT

A light assembly for a passenger compartment of a vehicle may include a housing configured to abut a window of a vehicle, a circuit board positioned within the housing, a first light source positioned within the housing and in electrical communication with the circuit board, and a second light source positioned within the housing and in electrical communication with the circuit board. The first light source selectively emits light through the window and beyond an exterior of the vehicle in a direction away from the passenger compartment and beyond a rear end of the vehicle relative to the light assembly, and the second light source emits light into the passenger compartment in a forward direction relative to the light assembly.

16 Claims, 4 Drawing Sheets

INTERIOR LIGHT ASSEMBLY FOR A VEHICLE WITH LIGHT ASSEMBLY EMITTING LIGHT INTO AND AWAY FROM THE PASSENGER COMPARTMENT

FIELD

The present disclosure relates to a taillight of a vehicle that is configured to illuminate a portion of a passenger compartment of a vehicle.

BACKGROUND

Lights within the passenger compartment of vehicles traditionally are independently mounted within the passenger compartment and arranged to illuminate seating areas within the passenger compartment. However, these lights often reflect off of rearview mirrors used by the operator to see behind the vehicle and/or windows of the vehicle, which may distract or impair the vision of the operator. Furthermore, these lights may be positioned so that one or more occupants of the vehicle have to adjust his or her posture to illuminate handheld objects in his or her possession.

SUMMARY

In at least some implementations, a vehicle includes a passenger compartment with a liftgate positioned at a rear end of the vehicle that at least partially defines the passenger compartment and an exterior of the vehicle, wherein the liftgate further comprises a structural body and a window connected to the structural body and that is at least partially transparent. A light assembly is coupled to the liftgate, wherein the light assembly includes a housing that defines part of an enclosure, a first light source located in the enclosure, and a second light source located in the enclosure, wherein the first light source is configured to emit light that is visible through the window in a direction away from the passenger compartment and the second light source is configured to emit light into the passenger compartment in a forward direction relative to the light assembly.

In at least some implementations, the first light source and the second light source are separately activated.

In at least some implementations, the first light source is activated by actuation of a brake pedal or a brake system of the vehicle.

In at least some implementations, the housing has an actuator configured to selectively activate the second light source.

In at least some implementations, a divider extends in a cross-car direction within the housing and separates the housing into two compartments, wherein the first light source is in a first compartment of the housing and the second light source is in a second compartment of the housing.

In at least some implementations, the divider prevents the first light source from emitting into the second compartment and prevents the second light source from emitting into the first compartment.

In at least some implementations, the divider is at least partially comprised of a circuit board, and the first light source and the second light source are in electrical communication with the circuit board.

In at least some implementations, the housing has an exterior surface that is exposed to the passenger compartment and an interior surface separate from the passenger compartment, the housing has a first surface that abuts the window of the liftgate, a second surface abuts the structural body of the liftgate.

In at least some implementations, both a first circuit board and a second circuit board are within the housing, and the first circuit board is in electrical communication with the first light source and the second circuit board is in electrical communication with the second light source.

In at least some implementations, the housing has an opening that extends through both the exterior surface and interior surface of the housing and the second light source emits light through the opening into the passenger compartment.

In at least some implementations, the second light source emits light into the passenger compartment at an angle greater than 45 degrees relative to a forward direction that is parallel to a ground surface.

In at least some implementations, the passenger compartment contains a first row of seats and a second row of seats positioned behind the first row of seats, wherein the second light source emits light over the second row of seats.

In at least some implementations, the second light source does not directly reach the first row of seats.

In at least some implementations, a light assembly for a passenger compartment of a vehicle includes a housing configured to abut a window of a vehicle, a circuit board positioned within the housing, and a first light source positioned within the housing and in electrical communication with the circuit board, and a second light source positioned within the housing and in electrical communication with the circuit board. The first light source selectively emits light through the window and beyond an exterior of the vehicle in a direction away from the passenger compartment and beyond a rear end of the vehicle relative to the light assembly, and the second light source emits light into the passenger compartment in a forward direction relative to the light assembly.

In at least some implementations, the first light source is activated by actuation of a brake pedal or a brake system of the vehicle, and the second light source is activated by an actuator within the passenger compartment.

In at least some implementations, the housing has an exterior surface that is exposed to the passenger compartment and an interior surface separate from the passenger compartment, the housing abuts a window of the vehicle and an opening extends through the exterior surface and the interior surface of the housing.

In at least some implementations, the second light source emits light through the opening into the passenger compartment at an angle greater than 45 degrees relative to a forward direction that is parallel to a ground surface.

In at least some implementations, the housing has a second opening that extends through the exterior surface and the interior surface and the second light source emits light through the second opening into the passenger compartment.

In at least some implementations, a divider extends in a cross-car direction within the housing and separates the housing into two compartments, wherein the first light source is in a first compartment of the housing and the second light source is in a second compartment of the housing.

In at least some implementations, the divider prevents the first light source from emitting into the second compartment and prevents the second light source from emitting into the first compartment.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
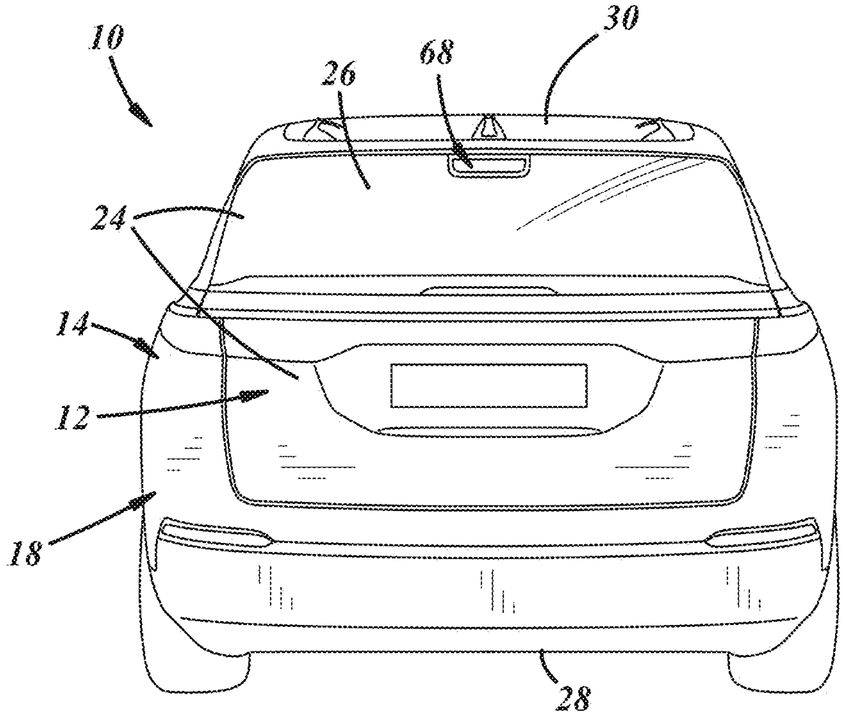
FIG. 1 is a rear view of a vehicle.

Referring in more detail to the drawings, FIG. 1 illustrates a vehicle 10 with a liftgate 12. The liftgate 12 (FIG. 2) defines part of a body 14 of the vehicle 10 and defines a boundary between an interior 16 (FIG. 3) and exterior 18 of the vehicle 10 at a rear portion of the vehicle 10. The liftgate 12 may be coupled to the frame by a hinge so that the liftgate 12 is movable to selectively provide access to a portion of the interior 16 such as a passenger compartment 20 and/or a cargo compartment that may be considered to be part of the passenger compartment 20 and is located between the liftgate 12 and a seating area 22 of the passenger compartment 20. The liftgate 12 includes a structural body 24 that extends from the hinge along the rear of the vehicle 10, and includes a window 26 mounted in an opening of the liftgate body 24. The window 26 may extend over or in the opening and a portion of the body 24, wherein the window 26 is transparent or translucent, to enable an operator to see through the window 26 from within the passenger compartment 20.

Figure 3:
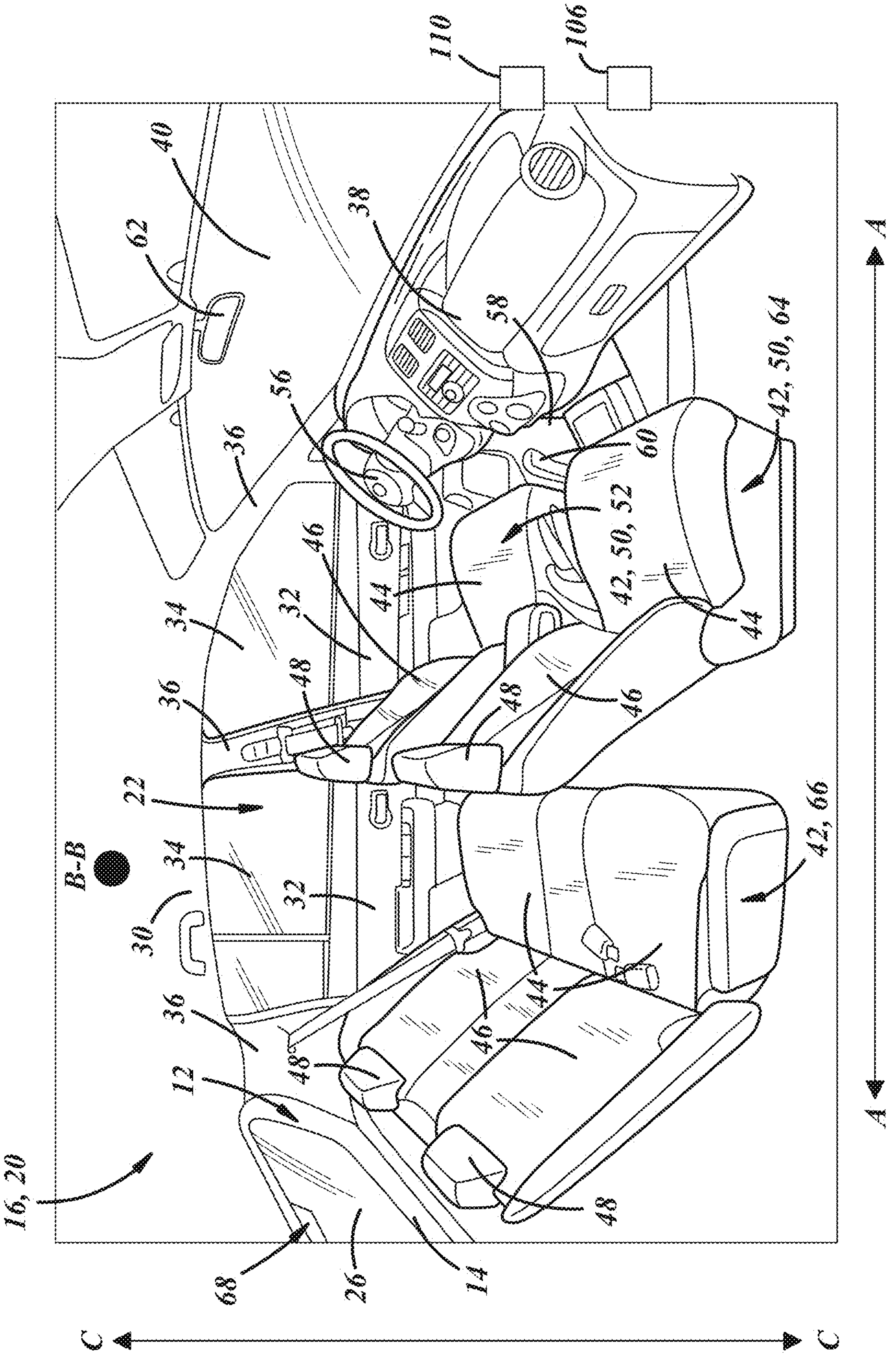
FIG. 3 is a side view of a passenger compartment of the vehicle.

The passenger compartment 20 extends: longitudinally in a fore-aft direction, as shown by arrow AA, that extends between the front and rear of the vehicle 10; laterally in what is sometimes called the cross-car direction, as shown by arrow BB, spanning between the operator and passenger sides (or left and right sides) of the vehicle 10; and vertically, as shown by arrow CC, between a floor 28 and roof 30 of the vehicle. As shown in FIG. 3, the passenger compartment 20 may be defined in the cross-car direction by doors 32 and side windows 34 that extend between pillars 36 of the vehicle 10. In the fore-aft direction, a dashboard 38 and windshield 40 define the front of the passenger compartment 20 and the rear liftgate 12 and window 26 define the rear of the passenger compartment 20. The floor 28 and the roof 30 of the vehicle 10 define the passenger compartment 20 in the vertical direction.

Multiple seats 42 are provided within the passenger compartment 20. In the fore-aft direction, two rows of seats 42 are shown, wherein each seat includes a seat bottom 44, a seatback 46, and a headrest 48, and extends upward from the floor 28 of the vehicle 10. A first row 50 of seats 42 is positioned towards the front of the passenger compartment 20, with an operator's seat 52 located near vehicle controls such as a steering wheel 56, pedals 58, and a gear selector 60. A rear-view mirror 62 may be positioned on or above the windshield 40 of the vehicle 10 to provide the operator of the vehicle 10 with a rearward view out the window 26 of the liftgate 12. A front passenger seat 64 is spaced from the operator's seat 52 in the cross-car direction, so that the first row 50 of seats 42 is positioned rearward of the dashboard 38 and windshield 40 of the vehicle 10. A second or rear row 66 of seats 42 is positioned behind the first row 50. As shown, the rear row 66 may be a bench that extends between the doors 32 of the vehicle 10 in the cross-car direction or may be individual seats similar to those in the first row 50. While two rows of seats 50 are shown in FIG. 3, in at least some implementations, the vehicle 10 may have more or less rows of seats 42, as desired.

Figure 2:
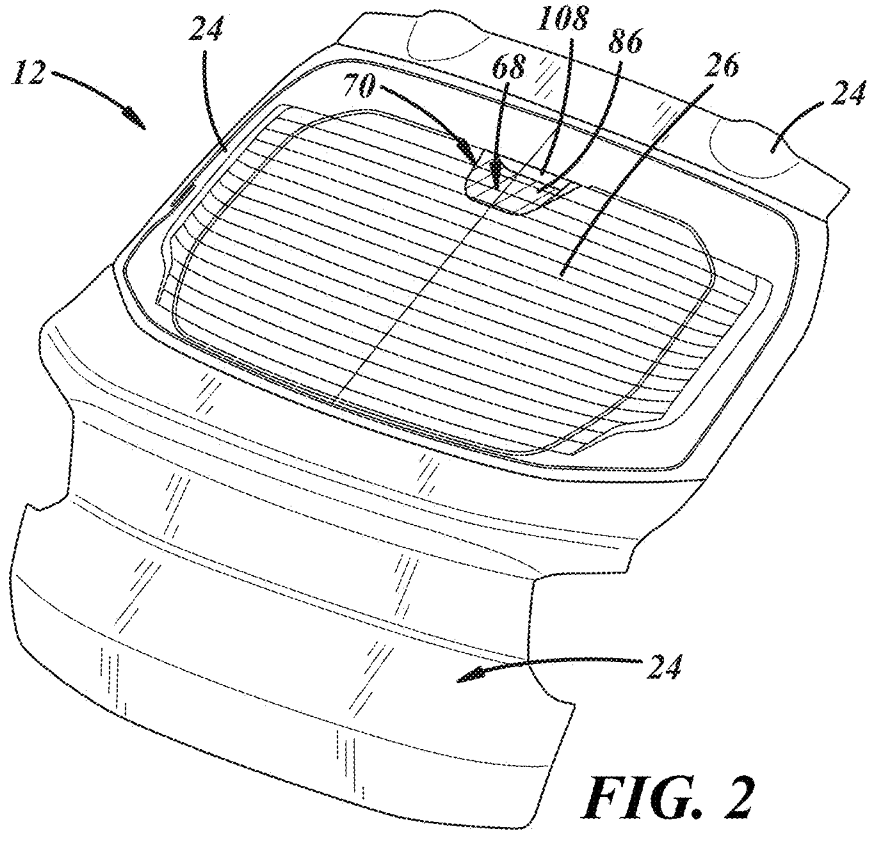
FIG. 2 is a perspective view of a liftgate of the vehicle including a window and light assembly.

As shown in FIGS. 1-3, a light assembly 68 is positioned rearward of the rear row 66 of seats 42 and is coupled to the liftgate 12 at an inner side of the liftgate 12 facing the passenger compartment 20. The light assembly 68 includes a housing 70 (FIGS. 4-5) with a base 72 and sidewalls 74. The sidewalls 74 are spaced apart on opposite sides of the base 72 in the cross-car direction and extend vertically from the base 72 and in the fore-aft direction generally between a front end 76 and a rear end 78 of the base 72. In assembly, the sidewalls 74 abut the window 34 and structural body 24 and exterior surfaces 80 of the base/sidewalls 72, 74 are exposed to the passenger compartment 20 while interior surfaces 82 of the base 72 and sidewalls 74 face the liftgate 12 and define an enclosure with the liftgate 12. The sidewalls 74 are shaped complementarily to the surfaces they abut, and flexible seals or gasket may be used along the edges of the housing 70 to inhibit or prevent light from leaking between the housing 70, liftgate 12, and window 30. The various surfaces of the housing 70 may be flat against the adjacent surfaces of the liftgate 12 so that the interior of the housing 70 is separated or concealed from the remainder of the passenger compartment 20. In at least some implementations, a first surface 81 abuts the window 26 of the liftgate 12, a second surface 83 abuts the structural body 24 of the liftgate 12. The exterior surface 80 defines an exterior 84 of the housing 70, and the interior surface 82 defines an interior 86 of the housing 70. In at least some implementations, at least when the liftgate 12 is in a closed position, the exterior surface 80 of the housing 70 faces inwardly toward the rearmost seats 42 in the passenger compartment 20.

Figure 5:
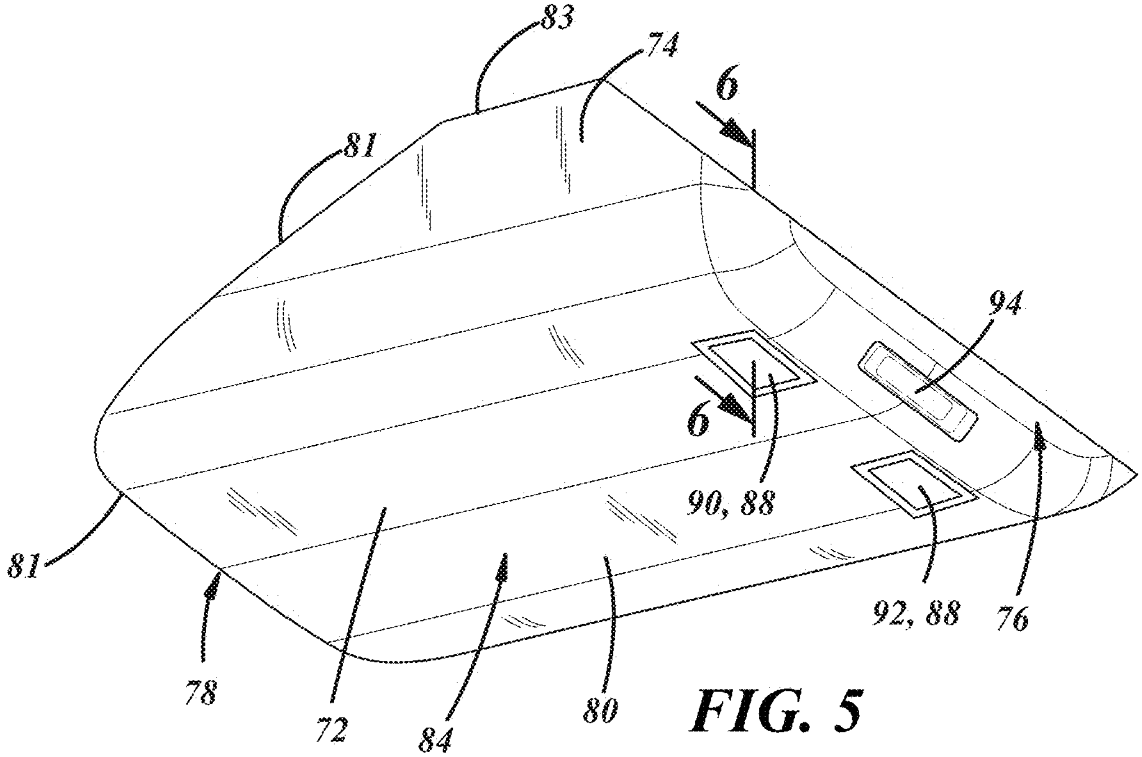
FIG. 5 is another perspective view of the light assembly.

One or more opening(s) 88 extend through the base 72 or sidewalls 74 of the housing 70 from the interior 86 of the housing 70 to the passenger compartment 20 of the vehicle 10. The opening(s) 88 may be covered by translucent or transparent coverings such as plastic, glass or the like, so that light can pass through the opening(s) 88, and the coverings may function as lenses to help focus or direct light emitted therethrough. As shown in FIG. 5, in at least some implementations, a first opening 90 and a second opening 92 are spaced in the cross-car direction and may be located nearer to the front of the housing 70 than the rear of the housing 70. The first opening 90 and the second opening 92 have rectangular shapes in the implementation shown. However, other quantities of openings, shapes of openings, sizes of openings, and locations of openings can be used, as desired.

In at least some implementations, an actuator 94 is positioned at the front of the housing 70 and is arranged to be easily accessible by an occupant seated in the rear row 66 of seats 42. The actuator 94 is configured to be selectively moved between an "on" and "off" position and may complete a circuit or send an electrical signal when turned on. The actuator 94 may take various forms, such as a mechanical toggle switch, push-button switch, or rotary knob, and may also include a touch-sensitive button or capacitive touch panel, to name a few. To aid visibility in low-light conditions, the actuator 94 may be illuminated, helping occupants locate it in the dark. In some implementations, multiple actuators 94 may be used throughout the vehicle 10, for instance, an additional actuator may be placed near one or more seats 42, including but not limited to the operator's seat 52, allowing control from the front of the passenger compartment 20.

Internal components of the light assembly 68 are housed within the interior 86 of the housing 70, between the housing 70, the window 26 of the liftgate 12, and the structural body 24 of the liftgate 12. These components include a first light source 96, a second light source 98, and a divider 100. The first light source 96 and second light source 98 are configured to emit light in at least one direction when powered by electricity. For example, the first light source 96 and second light source 98 may be, by way of non-limiting examples, incandescent or halogen bulbs or light-emitting diodes (LEDs). Other types of lighting may be used as well.

Figure 4:
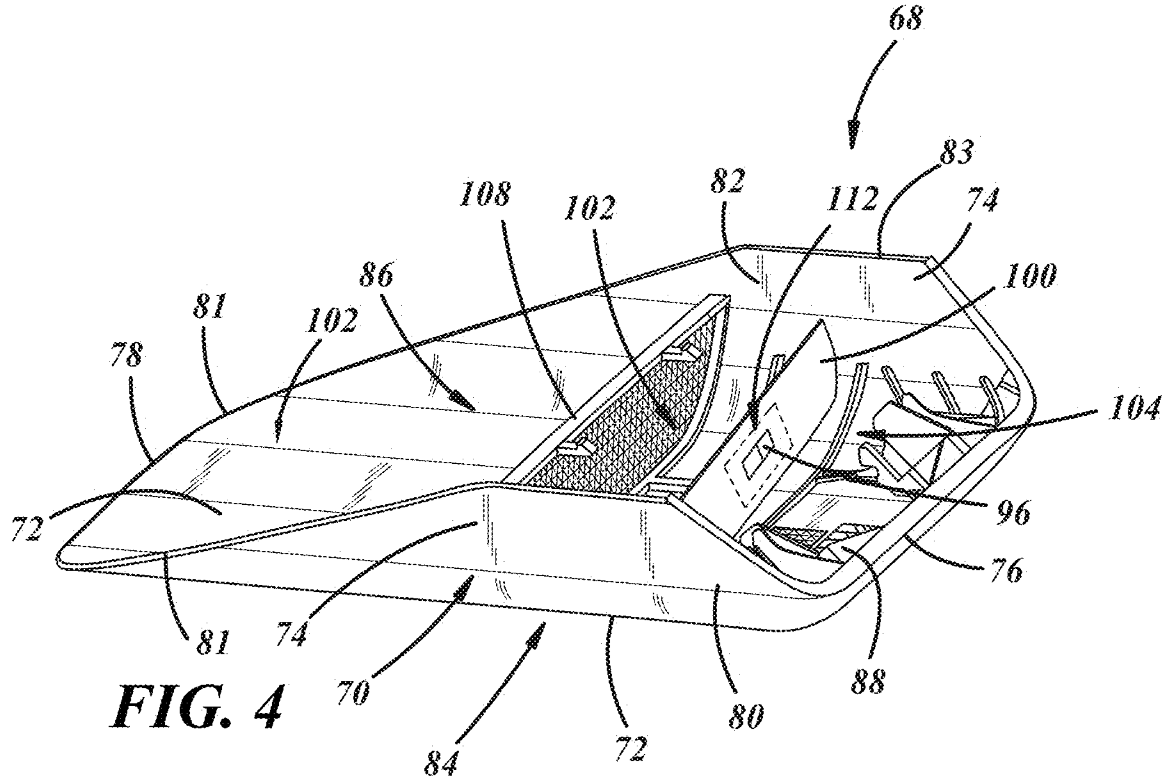
FIG. 4 is a perspective view of the light assembly.
Figure 6:
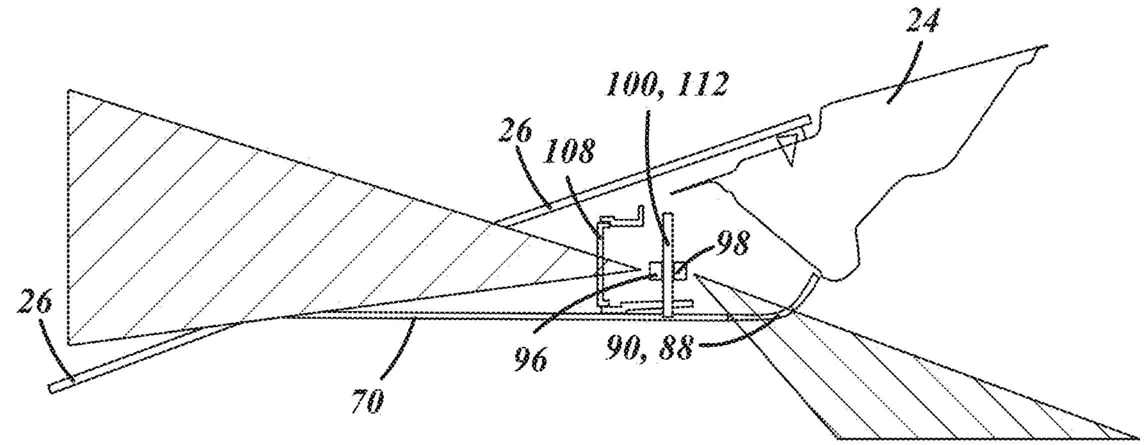
FIG. 6 is a cross-sectional view of the light assembly through section line 6-6.
Figure 7:
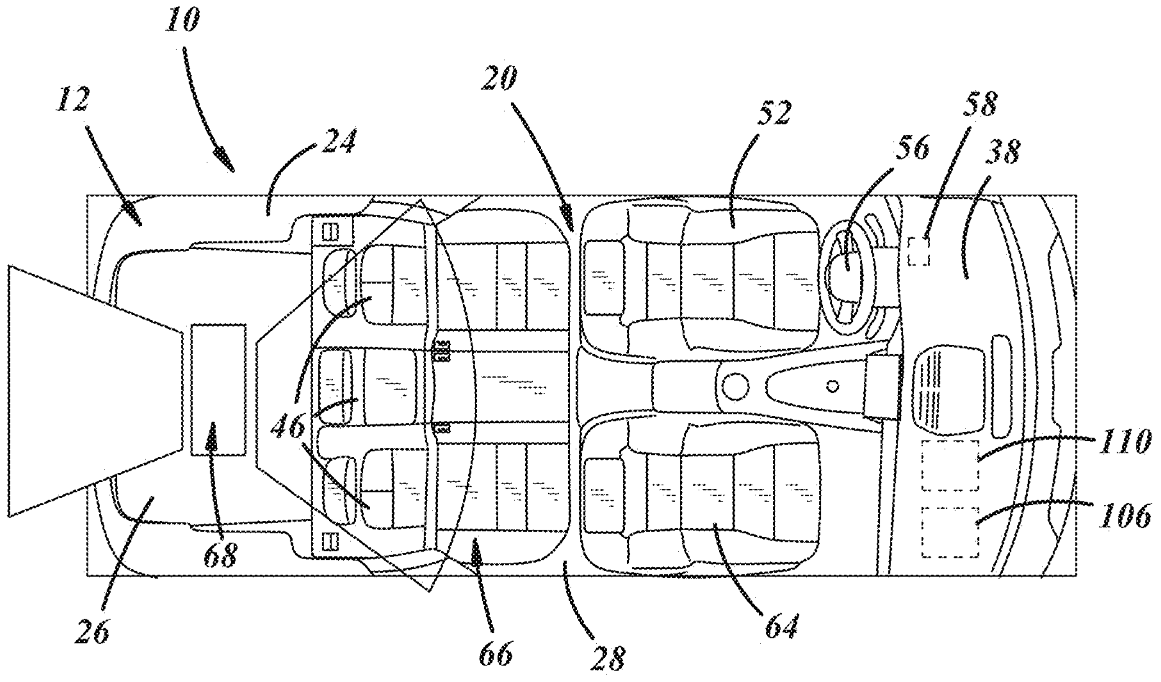
FIG. 7 is a top view of the passenger compartment including the light assembly.

As shown by FIGS. 4 and 6, the divider 100 extends in the cross-car direction and vertical direction to partition the interior 82 of the housing 70 into two compartments. The first light source 96 is in a first compartment 102 of the housing 70 and the second light source 98 is in a second compartment 104 of the housing 70. The first compartment 102 is positioned rearward of the divider 100 in the fore-aft direction, and the second compartment 104 is positioned forward of the divider 100 in the fore-aft direction. The divider 100 may be integrally formed with the housing 70 or may be separate and coupled to the housing 70 so that the divider 100 abuts the interior surface 82 of the housing 70 to prevent light leakage from the first compartment 102 to the second compartment 104 and the second compartment 104 to the first compartment 102. The first light source 96 is mounted within the housing 70 rearward of the divider 100 and is configured to emit light rearward from the light assembly 68 in the fore-aft direction and through the window 26 of the liftgate 12 so that the emitted light is visible from beyond the exterior 18 of the vehicle 10 behind the liftgate 12. The first light source 96 is selectively activatable and may be configured to emit red light when a brake pedal or brake system 106 (FIGS. 3 and 7) of the vehicle 10 is actuated to indicate that the brakes of the vehicle 10 are being applied. To emit red light, the first light source 96 may be configured to emit light that is red in color, i.e. a red colored LED, or the light emitted from the first light may pass through a translucent cover or lens that is red in color. As shown by FIGS. 2, 4, the first compartment 102 is open to the window 26, and the cover or lens 108 is positioned in the first compartment 102 between the window 26 and the first light source 96. The cover or lens 108 permits light emitted from the first light source 96 to pass through so that light is visible through the window 26 from behind the vehicle 10.

The second light source 98 is located within the second compartment 104 of the housing 70, forward of the divider 100, and is configured to emit light through the openings 88 in the exterior surface of the housing. The openings 88 and/or lens or coverings of the openings 88, may be oriented so that light emitted from the second light source 98 is directed forward in the fore aft direction and downward in the vertical direction from the light assembly 68. This light is thus directed into and illuminates at least part of the passenger compartment 20. In at least some implementations, light is emitted from the second light source 98 and into the passenger compartment 20 at an angle greater than 45 degrees relative to the forward direction (i.e. fore-aft direction). In at least some implementations, the housing 70 and openings 88 are arranged so that at least some of the light emitted through the openings 88 is directed over the seatbacks 46 of the rearmost seats (which in the illustrated embodiment is the second row 66 of seats 42). In at least some implementations, the emitted light may be focused and angled so that it does not directly reach the first row of seats (i.e. is at an emitted angle that falls short of the seats in the front row 50 of seats 42. The second light source 98 is selectively activatable and may be connected to and configured to be activated by the actuator 94 in the passenger compartment 20 and/or by a vehicle control system 110 which may selectively enable electricity to be provided to the light source 98. The first light source 96 and the second light source 98 are separately activated so that light may be separately and independently emitted from the light sources 96, 98.

In at least some implementations, such as implementations with LED(s) as the first light source 96 and second light source 98, one or more circuit boards 112 may be used to power and regulate operation of the light sources 96, 98. The first and second light sources 96, 98 may be mounted to the same or separate circuit board(s) 112 so that the first and second light sources 96, 98 are in electrical communication with the circuit board(s) 112. The circuit boards 112 may partially or wholly constitute the divider 100, may be integrated with, positioned on, or positioned near the divider 100. The circuit board 112 may include conductive material and be configured to connect electrical components such as plugs, connectors, controllers (e.g. processors), sensors, or other electronic circuit elements to the circuit boards 112.

In at least some implementation, the circuit board 112 may be a single printed circuit board arranged so that electronic components can be affixed to opposite sides of the circuit board 112. The circuit board 112 may also be two or more printed circuit boards positioned in the interior 86 of the housing 70, for example, with one circuit board arranged to accommodate the electronic circuit components associated with the first light source 96 and another circuit board arranged to accommodate the electronic circuit components associated with the second light source 98, if desired. So that the first light source 96 may be in electrical communication with a first circuit board and the second light source 98 may be in electrical communication with a second circuit board.

Traditionally, cabin lights are fixed to or within a roof of the vehicle and are positioned directly above or in front of seats within the passenger compartment, separate from the vehicle's taillights including a center high-mounted stop lamp (CHMSL). Thus, the cabin lights and taillights each require separate housings and wiring, requiring increased time and complexity of assembly. Furthermore, when the cabin lights are positioned above or in front of the occupant in the rear row of the vehicle, the occupant must orient his or her body forward, away from the seat back to illuminate items held by the vehicle occupant. The rearwardly directed light can also shine in the eyes of passengers and otherwise be annoying. Often, cabin lights can reflect off of mirrors used by the operator to see behind and to the sides of the vehicle, which can be distracting and undesirable to the operator.

The light assembly 68 integrated with the liftgate 12 as described herein, may replace one or more traditional interior lights or may provide additional interior lighting in addition to traditional interior lights without adding to the complexity of assembly. By positioning the second light source 98 at a high position at the top of the rear window 26 of the liftgate 12 and behind the rear seats 66, the light emitted from the second light source 98 and out of the housing 70 is directed over the rear vehicle occupants head and shoulders. The light is thus emitted from behind the rearmost row 66 of seats 42 and is directed forward toward the rearmost row 66 of seats 42. The forwardly directed light does not shine into the eyes of people in the rearmost row 66 of seats 42, and can enable use of the light by the passengers with a comfortable and safe posture against the seatbacks 46 of the rear seats 66. Furthermore, the light emitted from the second light source 98 can be angled beneath the rear view mirror 62 of the vehicle 10, so that the light interacts less with the rear view mirror 62. Therefore, the vehicle operator is not distracted, and the operator's vision is not obstructed by the light.

So arranged, the CHMSL and interior lighting provided by the second light source 98 can be integrated into the same housing 70. This simplifies assembly of the two light sources 96, 98 into the vehicle 10 in that separate components need not be separately handled and installed, and, among other things, provides a single destination for the wiring for both light sources.

What is claimed is:

1. A vehicle, comprising:

a passenger compartment having a floor;

a liftgate positioned at a rear end of the vehicle, the liftgate at least partially defines the passenger compartment and an exterior of the vehicle, wherein the liftgate further comprises a structural body and a window connected to the structural body and that is at least partially transparent, the liftgate is movable between an open position and a closed position; and a light assembly coupled to the liftgate, wherein the light assembly includes a housing that defines part of an enclosure, a first light source located in the enclosure, and a second light source located in the enclosure, wherein the first light source is configured to emit light that is visible through the window in a direction away from the passenger compartment and the second light source is configured to emit light into the passenger compartment in a forward direction relative to the light assembly, wherein the housing has an exterior surface that is exposed to the passenger compartment and an interior surface separate from the passenger compartment, the housing has a first surface that abuts the window of the liftgate, a second surface abuts the structural body of the liftgate, wherein the housing has an opening that extends through both the exterior surface and interior surface of the housing and the second light source emits light through the opening into the passenger compartment, and wherein the second light source emits light into the passenger compartment toward the floor and at an angle greater than 45 degrees relative to a forward direction that is parallel to a ground surface when the liftgate is in the closed position and the second light source does not emit light into the passenger compartment at an angle less than 45 degrees from the forward direction when the liftgate is in the closed position.

2. The vehicle of claim 1, wherein the first light source and the second light source are separately activated.

3. The vehicle of claim 2, wherein the first light source is activated by actuation of a brake pedal or a brake system of the vehicle.

4. The vehicle of claim 2, wherein the housing has an actuator configured to selectively activate the second light source.

5. The vehicle of claim 3, further comprising a divider that extends in a cross-car direction within the housing and separates the housing into two compartments, wherein the first light source is in a first compartment of the housing and the second light source is in a second compartment of the housing.

6. The vehicle of claim 5, wherein the divider prevents the first light source from emitting into the second compartment and prevents the second light source from emitting into the first compartment.

7. The vehicle of claim 6, wherein the divider is at least partially comprised of a circuit board, and the first light source and the second light source are in electrical communication with the circuit board.

8. The vehicle of claim 6, wherein both a first circuit board and a second circuit board are within the housing, and the first circuit board is in electrical communication with the first light source and the second circuit board is in electrical communication with the second light source.

9. The vehicle of claim 1, wherein the passenger compartment contains a first row of seats and a second row of seats positioned behind the first row of seats, wherein the second light source emits light over the second row of seats.

10. The vehicle of claim 9, wherein the second light source does not directly reach the first row of seats.

11. A light assembly for a passenger compartment of a vehicle, comprising:

a housing configured to abut a window of a vehicle;

a circuit board positioned within the housing; and a first light source positioned within the housing and in electrical communication with the circuit board, and a second light source positioned within the housing and in electrical communication with the circuit board, wherein the first light source selectively emits light through the window and beyond an exterior of the vehicle in a direction away from the passenger compartment and beyond a rear end of the vehicle relative to the light assembly, and the second light source emits light into the passenger compartment in a forward direction relative to the light assembly, where the forward direction is parallel to a ground surface, and wherein the second light source emits light downwardly and at an angle greater than 45 degrees relative to the forward direction and the second light source does not emit light into the passenger compartment at an angle less than 45 degrees from the forward direction when the liftgate is in the closed position.

12. The light assembly of claim 11, wherein the first light source is activated by actuation of a brake pedal or a brake system of the vehicle, and the second light source is activated by an actuator within the passenger compartment.

13. The light assembly of claim 12, wherein the housing has an exterior surface that is exposed to the passenger compartment and an interior surface separate from the passenger compartment, the housing abuts a window of the vehicle and an opening extends through the exterior surface and the interior surface of the housing.

14. The light assembly of claim 13, wherein the housing has a second opening that extends through the exterior surface and the interior surface and the second light source emits light through the second opening into the passenger compartment.

15. The light assembly of claim 11, further comprising a divider that extends in a cross-car direction within the housing and separates the housing into two compartments, wherein the first light source is in a first compartment of the housing and the second light source is in a second compartment of the housing.

16. The light assembly of claim 15, wherein the divider prevents the first light source from emitting into the second compartment and prevents the second light source from emitting into the first compartment.

* * * * *